(12) United States Patent
Fujii

(10) Patent No.: US 11,607,913 B2
(45) Date of Patent: Mar. 21, 2023

(54) PNEUMATIC TIRE

(71) Applicant: The Yokohama Rubber Co., LTD., Tokyo (JP)

(72) Inventor: Hiroshi Fujii, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 17/594,321

(22) PCT Filed: Mar. 17, 2020

(86) PCT No.: PCT/JP2020/011842
§ 371 (c)(1),
(2) Date: Oct. 11, 2021

(87) PCT Pub. No.: WO2020/213335
PCT Pub. Date: Oct. 22, 2020

(65) Prior Publication Data
US 2022/0088968 A1   Mar. 24, 2022

(30) Foreign Application Priority Data
Apr. 15, 2019  (JP) .............................. JP2019-077253

(51) Int. Cl.
*B60C 11/13*   (2006.01)
*B60C 11/00*   (2006.01)
*B60C 11/03*   (2006.01)

(52) U.S. Cl.
CPC ........ *B60C 11/005* (2013.01); *B60C 11/1323* (2013.01); *B60C 2011/0016* (2013.01);
(Continued)

(58) Field of Classification Search
CPC ... B60C 11/005; B60C 11/0083; B60C 11/01; B60C 11/1323
See application file for complete search history.

(56) References Cited

U.S. PATENT DOCUMENTS 3,853,164 A * 12/1974 Mirtain ..................... B60C 9/18
152/209.5
4,282,918 A *  8/1981 Tomoda ................ B60C 9/0292
152/454
(Continued)

FOREIGN PATENT DOCUMENTS

JP    S49-67305 A    6/1974
JP    S60-189609  *  9/1985
(Continued)

OTHER PUBLICATIONS

English machine translation of JPS60-189609 (Year: 1985).*
(Continued)

*Primary Examiner* — Robert C Dye
(74) *Attorney, Agent, or Firm* — Thorpe North & Western

(57) ABSTRACT

In a state in which a pneumatic tire is mounted on a specified rim, inflated to 92% of a specified internal pressure, and loaded with a load of 75% of the maximum load capacity, an average thickness of an undertread rubber is smaller in a center region than in a shoulder region, a ratio (CAO/UAO) is 0.15 or more and 0.95 or less, a ratio (UAI/UAO) is less than 1, and a ratio (L/W) is 0.29 or more and 0.51 or less, in a tire meridian cross-sectional view, where CAO, UAO and UAI are cross-sectional areas of the cap tread rubber, the undertread rubber, and the undertread rubber in the center region, respectively, L is a tire width direction dimension from a defined intersection point to a ground contact edge, and W is a tire width direction dimension of each shoulder region.

6 Claims, 4 Drawing Sheets

(52) U.S. Cl.
CPC .......... *B60C 2011/0353* (2013.01); *B60C 2011/0355* (2013.01); *B60C 2011/0381* (2013.01); *B60C 2011/0383* (2013.01)

(56) References Cited

U.S. PATENT DOCUMENTS

| | | | | |
|---|---|---|---|---|
| 5,567,253 | A | * | 10/1996 | Iwamura ............ B60C 11/0302 152/209.24 |
| 5,785,780 | A | * | 7/1998 | Ochi .................. B60C 11/033 152/DIG. 3 |

FOREIGN PATENT DOCUMENTS

| | | | |
|---|---|---|---|
| JP | H02-034405 | * | 2/1990 |
| JP | H03-042306 | * | 2/1991 |
| JP | H06-183214 | * | 7/1994 |
| JP | 2001-191732 | * | 7/2001 |
| JP | 2001-191732 A | | 7/2001 |
| JP | 2003-127614 | * | 5/2003 |
| JP | 2008-273485 A | | 11/2008 |
| JP | 2013-79016 A | | 5/2013 |
| JP | 2016-068834 A | | 5/2016 |
| JP | 2017-105411 A | | 6/2017 |
| WO | 2008/056508 A1 | | 5/2008 |

OTHER PUBLICATIONS

English machine translation of JPH02-034405. (Year: 1990).*
English machine translation of JPH06-183214 (Year: 1994).*
English machine translation of JP2001-191732. (Year: 2001).*
Machine translation of JPH03-042306 (Year: 1991).*

* cited by examiner

PNEUMATIC TIRE

TECHNICAL FIELD

The present technology relates to a pneumatic tire with reduced tire noise and improved steering stability performance.

BACKGROUND ART

In recent years, there has been concern about the influence of automobile noise on the global environment, and various proposals have been made regarding techniques for reducing noise during tire rotation among components of automobile noise.

For example, a pneumatic tire with reduced tire noise during travel has been proposed in which protrusions extending along an opening end edge on a trailing side in a tire rotation direction are formed on a surface of an outer land portion, and apexes of the protrusions are located closer to an inner side in a radial direction than a circumferential tangential line of an opening end edge on a leading side in the tire rotation direction (see Japan Unexamined Patent Publication No. 2017-105411). In Japan Unexamined Patent Publication No. 2017-105411, a protrusion is formed on the surface of a tread, and a vibration width in the tire radial direction of a belt layer in a portion that overlaps the protrusion is suppressed to reduce the tire noise.

A pneumatic tire with an improved noise performance has been proposed in which a circumferential belt includes at least a tire equator, a region in a tire width direction having a width in the tire width direction of 0.2 times or greater and 0.7 times or smaller than the maximum width in the tire width direction of the circumferential belt is a center region, the rigidity in the tire circumferential direction per unit width of any portion of the center region is greater than the rigidity in the tire circumferential direction per unit width of any portion of both adjacent shoulder regions, and a width of one shoulder region is 1.5 times or greater and 8.0 times or smaller than the width of the other shoulder region (see Japan Unexamined Patent Publication No. 2016-068834). In Japan Unexamined Patent Publication No. 2016-068834, the rigidity of the circumferential belt is increased to reduce noise emission, the widths of the two shoulder regions of the circumferential belt are made asymmetric so that the vibration modes in these shoulder regions are different and the peak level of sound is lowered. In this way, tire noise is reduced.

As described above, in Japan Unexamined Patent Publication Nos. 2017-105411 and 2016-068834, the tire noise is reduced on the basis of effects caused by a so-called tire structure, such as formation of protrusions and improvements in the circumferential belt. However, generally, the selection of the rubber material to be used in the tread rubber has a great effect on reducing the tire noise, but, no knowledge about the selection of such a material is disclosed in Japan Unexamined Patent Publication Nos. 2017-105411 and 2016-068834. Therefore, there is room for further improvement in the techniques of Japan Unexamined Patent Publication Nos. 2017-105411 and 2016-068834.

In recent years, it is often required to improve the steering stability performance so that the sense of security of the driver is enhanced as well as reducing the tire noise. Furthermore, it is expected that reduction of the driver's burden and safe steering of an automobile while considering the global environment will be required at a higher level in the future.

SUMMARY

The present technology provides a pneumatic tire which realizes reduction in tire noise and improvement in steering stability performance in a well-balanced manner.

A pneumatic tire according to an embodiment of the present technology includes a carcass including at least one carcass ply, a belt including a belt layer including cords, the belt being disposed on an outer side in a tire radial direction of the carcass, and a tread rubber disposed on the outer side in the tire radial direction of the belt. The tread rubber constitutes a portion of a tread portion, and at least one circumferential main groove having a total width of 15% or greater of a ground contact width is formed in the tread portion.

The tread rubber includes an undertread rubber and a cap tread rubber formed on the outer side in the tire radial direction of the undertread rubber. The cap tread rubber is formed of rubber having a hardness lower than that of the undertread rubber.

In a state in which the pneumatic tire is mounted on a specified rim, inflated to 92% of a specified internal pressure, and loaded with a load of 75% of a maximum load capacity, and when a tire ground contact width is divided into four regions in a tire width direction in a tire meridian cross-sectional view and two out of the four regions located in a center in the tire width direction are regarded as a center region and remaining two regions are regarded as shoulder regions, an average thickness of the undertread rubber is smaller in the center region than in the shoulder region.

In the tire meridian cross-sectional view, in a region of the shoulder region, located closer to an inner side in the tire radial direction than an imaginary line that extends in parallel to a tire profile line at a position located 1.6 mm on the outer side in the tire radial direction from a groove bottom of the circumferential main groove, a ratio CAO/UAO of a cross-sectional area CAO of the cap tread rubber to a cross-sectional area UAO of the undertread rubber is 0.15 or more and 0.95 or less.

In the tire meridian cross-sectional view, a ratio UAI/UAO of a cross-sectional area UAI of the undertread rubber in the center region to a cross-sectional area UAO of the undertread rubber in the shoulder region is less than 1.

In a tire plan view, a ratio L/W of a dimension L from an intersection point P1 between an extension line of the imaginary line and a tread profile line to a ground contact edge to a tire width direction dimension W of each shoulder region is 0.29 or more and 0.51 or less.

In the pneumatic tire according to an embodiment of the present technology, improvements are made particularly to the relationship between the average thicknesses of the undertread rubber in the center region and in the shoulder region, the relationship between the cross-sectional area CAO of the cap tread rubber and the cross-sectional area UAO of the undertread rubber in the shoulder region, the relationship between the cross-sectional area UAI of the undertread rubber in the center region and the cross-sectional area UAO of the undertread rubber in the shoulder region, and the relationship between a dimension from a predetermined position on a tire surface to a ground contact edge and the tire width direction dimension of each shoulder region as well as the relationship between the hardnesses of the undertread rubber and the cap tread rubber. As a result, the pneumatic tire according to an embodiment of the present technology can improve tire noise and steering stability performance in a well-balanced manner.

DETAILED DESCRIPTION

Pneumatic tires according to embodiments (Basic Embodiment and Additional Embodiments 1 to 5 illustrated below) of the present technology will be described in detail below with reference to the drawings. Note that the present technology is not limited to these embodiments. Constituents of the embodiments include components that are substantially identical or that can be substituted or easily conceived by one skilled in the art. In addition, various modes included in the embodiments can be combined as desired within the scope of obviousness by one skilled in the art.

Basic Embodiment

The Basic Embodiment of the pneumatic tire according to an embodiment of the present technology will be described below. Herein, "tire radial direction" refers to the direction orthogonal to the rotation axis of the pneumatic tire, "inner side in the tire radial direction" refers to a side toward the rotation axis in the tire radial direction, and "outer side in the tire radial direction" refers to a side away from the rotation axis in the tire radial direction. In addition, "tire circumferential direction" refers to the circumferential direction with the rotation axis as the center axis. Moreover, "tire width direction" refers to a direction parallel to the rotation axis, "inner side in the tire width direction" refers to a side toward a tire equatorial plane (tire equator line) in the tire width direction, and "outer side in the tire width direction" refers to a side away from the tire equatorial plane in the tire width direction. Note that "tire equatorial plane CL" refers to the plane that is orthogonal to the rotation axis of the pneumatic tire and that passes through the center of the tire width of the pneumatic tire.

Figure 1:
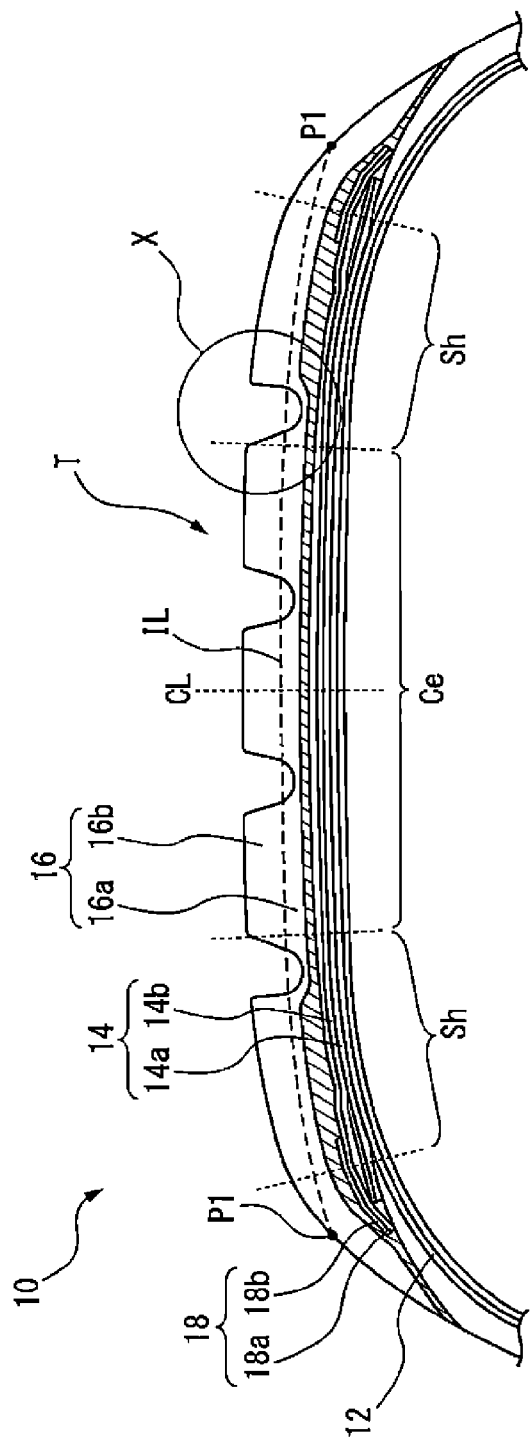
FIG. 1 is a tire meridian cross-sectional view illustrating a pneumatic tire according to an embodiment of the present technology.

FIG. 1 is a tire meridian cross-sectional view illustrating a pneumatic tire according to an embodiment of the present technology. Note that FIG. 1 illustrates a state in which a pneumatic tire 10 is mounted on a specified rim, inflated to 75% of a specified internal pressure, and loaded with a load of 100% of the maximum load capacity. The pneumatic tire 10 illustrated in the same drawing includes a carcass 12 including at least one carcass ply (one carcass ply is illustrated in the same drawing), a belt 14 including belt layers 14a and 14b including cords, disposed on an outer side in the tire radial direction of the carcass 12, and a tread rubber 16 disposed on the outer side in the tire radial direction of the belt 14 and constituting a portion of a tread portion T. Note that in the example illustrated in FIG. 1, a belt cover 18 including two belt cover layers 18a and 18b is formed on the outer side in the tire radial direction of the belt layer 14b so as to cover the outer end portions in the tire width direction of the belt layers 14a and 14b.

Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Furthermore, "maximum load capacity" refers to the "maximum load capacity" defined by JATMA, the maximum value in "TIRE LOAD LIMITS AT VARIOUS COLD INFLATION PRESSURES" defined by TRA, or the "LOAD CAPACITY" defined by ETRTO.

Figure 2:
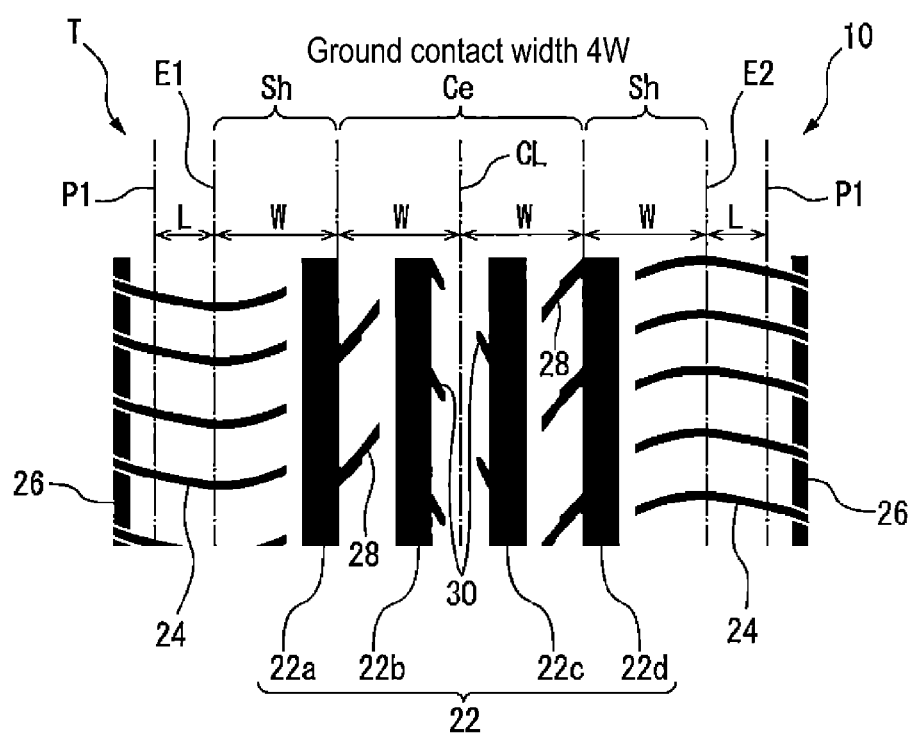
FIG. 2 is a plan view illustrating a tread pattern of the pneumatic tire according to the present embodiment illustrated in FIG. 1.

FIG. 2 is a plan view illustrating a tread pattern of the pneumatic tire according to the present embodiment illustrated in FIG. 1. Note that the reference signs E1 and E2 in FIG. 2 indicate the ground contact edge lines (lines along which continuous ground contact edges are connected in the tire circumferential direction). As illustrated in FIG. 2, four circumferential main grooves 22 (22a to 22d) having a total width of 15% or greater of the ground contact width are formed in the tread portion T of the pneumatic tire 10. Here, "main groove" refers to a groove on which a wear indicator must be provided as specified by JATMA and typically has a width of 2% or greater of the tread width TW. Note that in the present specification, "groove width" refers to the dimension between adjacent land portions measured in a direction perpendicular to the extension direction of the grooves in the opening portion of the groove. Note that in the example illustrated in FIG. 2, in addition to the circumferential main grooves 22, lug grooves 24, circumferential narrow grooves 26, and inclined grooves 28 and 30 are formed as illustrated in the same drawing.

Under the assumptions as described above, in the pneumatic tire 10 according to the present embodiment, as illustrated in FIG. 1, the tread rubber 16 includes an undertread rubber 16a (a hatched portion in the same drawing) and a cap tread rubber 16b formed on the outer side in the tire radial direction of the undertread rubber 16a, the cap tread rubber 16b being formed of rubber having a hardness lower than the undertread rubber 16a.

Furthermore, in the pneumatic tire 10 according to the present embodiment, as illustrated in FIG. 1, in a state in which the pneumatic tire 10 is mounted on a specified rim, inflated to 92% of a specified internal pressure, and loaded with a load of 75% of the maximum load capacity, and when two regions in the center in the tire width direction out of four regions obtained by dividing a tire ground contact width 4W into quarters in the tire meridian cross-sectional view are regarded as a center region Ce and the remaining two regions are regarded as shoulder regions Sh and Sh, the average thickness of the undertread rubber 16a is smaller in the center region Ce than in the shoulder region Sh. Here, the average thickness of the undertread rubber 16a refers to a calculated average value of thicknesses measured at thirteen points obtained by dividing the center region Ce into six equal portions in the tire width direction and dividing each of the shoulder regions Sh and Sh into three equal portions in the tire width direction.

In the pneumatic tire 10 according to the present embodiment, as illustrated in FIG. 1, in a region in each of the shoulder regions Sh and Sh, located closer to the inner side in the tire radial direction than an imaginary line IL that extends in parallel to a tire profile line (an outer contour of a tire tread (only within the ground contact width) on the assumption that the groove is not present) at a position located 1.6 mm on the outer side in the tire radial direction from the groove bottom of the circumferential main groove, the ratio CAO/UAO of the cross-sectional area CAO of the cap tread rubber 16*b* to the cross-sectional area UAO of the undertread rubber 16*a* is 0.15 or more and 0.95 or less.

Furthermore, in the pneumatic tire 10 according to the present embodiment, as illustrated in FIG. 1, the ratio UAI/UAO of the cross-sectional area UAI of the undertread rubber 16*a* in the center region Ce to the cross-sectional area UAO of the undertread rubber 16*a* in the shoulder region Sh is less than 1.

In addition, in the pneumatic tire 10 according to the present embodiment, as illustrated in FIGS. 1 and 2, a ratio L/W of a tire width direction dimension L from an intersection point P1 between an extension line of the imaginary line IL and a tread profile line to a ground contact edge E1 (E2) to a tire width direction dimension W of each of the shoulder regions Sh and Sh is 0.29 or more and 0.51 or less.

Effects

In the pneumatic tire according to the present embodiment, the hardness of the cap tread rubber 16*b* is lower than that of the undertread rubber 16*a* in the tire meridian cross-sectional view illustrated in FIG. 1. Generally, it is known that the lower the hardness of rubber formed on a tire surface is, the lower the tire noise is. Thus, with the limitations regarding hardness as described above, tire noise can be reduced by exposing relatively soft rubber on a tire surface over a period from when a tire is new until the terminal stage of tire wear (a state in which a tire is worn to the imaginary line IL illustrated in FIG. 1) (Effect 1).

Furthermore, in the pneumatic tire according to the present embodiment, the average thickness of the undertread rubber 16*a* is set to be smaller in the center region Ce than in the shoulder region Sh in the tire meridian cross-sectional view illustrated in FIG. 1. Accordingly, tire noise can be reduced by use of a large amount of the cap tread rubber 16*b* having a relatively soft nature in the center region Ce which is always in contact with a road surface. On the other hand, in the shoulder region Sh, the average thickness of the undertread rubber 16*a* is set relatively large to ensure excellent rigidity of the tread rubber as a whole, and thus excellent cornering power can be achieved during travel (Effect 2).

Furthermore, according to the configuration described above, the use of a large amount of the undertread rubber 16*a* having a relatively hard nature in the shoulder region Sh prevents excessive expansion of the ground contact width especially in the terminal stage of wear. This allows reduction in tire noise from the early stage to the terminal stage of wear without excessively increasing the region causing tire noise (Effect 3).

Next, in the pneumatic tire according to the present embodiment, when the ratio CAO/UAO is 0.15 or more in the tire meridian cross-sectional view illustrated in FIG. 1, the undertread rubber 16*a* is not exposed at the terminal stage of wear in the shoulder region Sh, and thus tire noise can be reduced (Effect 4). When the ratio CAO/UAO is 0.30 or more, the above effect is achieved at a high level.

On the other hand, when the ratio CAO/UAO is 0.95 or less, the undertread rubber 16*a* having a relatively hard nature is reliably located near a surface without being exposed at the terminal stage of wear. This makes it possible to ensure excellent block rigidity of the tread rubber as a whole especially in the shoulder region Sh (Effect 5). When the ratio CAO/UAO is 0.70 or less, the above effect is achieved at a high level.

Furthermore, in the pneumatic tire according to the present embodiment, when the ratio UAI/UAO is set to be less than 1 in FIG. 1, the cross-sectional area of the undertread rubber 16*a* having a relatively hard nature can be sufficiently reduced in the center region Ce having a high impact on tire noise. In other words, the cap tread rubber 16*b* having a soft nature can reliably remain in the center region Ce even at the terminal stage of wear so that tire noise can be reduced (Effect 6). When the ratio UAI/UAO is 0.9 or less, the above effect is achieved at a high level.

On the other hand, according to the configuration described above, in the shoulder region Sh having a high impact on steering stability performance, the undertread rubber 16*a* having a relatively hard nature is reliably located near a surface especially at the terminal stage of wear. This makes it possible to ensure excellent rigidity of the tread rubber as a whole in the shoulder region Sh at the terminal stage of wear (Effect 7). When the ratio UAI/UAO is 0.9 or less, the above effect is achieved at a high level.

Besides, in the pneumatic tire according to the present embodiment, as illustrated in FIGS. 1 and 2, when the ratio L/W is 0.29 or more, the dimension L from the intersection point P1 between the extension line of the imaginary line IL and the tread profile line to the ground contact edge E1 (E2) can be sufficiently ensured. This makes it possible to prevent excessive wear at or near the ground contact edge when the tire is new and ensure excellent rigidity in the shoulder region Sh (Effect 8). When the ratio L/W is 0.35 or more, the above effect is achieved at a high level.

On the other hand, in the pneumatic tire according to the present embodiment as illustrated in FIGS. 1 and 2, when the ratio L/W is 0.51 or less, excessive increase in the dimension L illustrated in FIG. 2 can be prevented. This allows the undertread rubber 16*a* having a hard nature to be reliably located near a surface in the shoulder region at the terminal stage of wear, making it possible to ensure excellent rigidity of the tread rubber as a whole, prevent expansion of the ground contact width and consequently realize reduction of tire noise (Effect 9). When the ratio L/W is 0.45 or less, the above effect is achieved at a high level.

As described above, in the pneumatic tire according to the present embodiment, interaction among Effects 1 to 9 described above can realize reduction in tire noise (especially attributable to Effects 1 to 4, 6 and 9 described above) and improvement in steering stability performance based on improvement in block rigidity (especially attributable to Effects 2, 5, 7 and 8 described above) in a well-balanced manner.

The pneumatic tire according to the present embodiment described above is obtained through ordinary manufacturing steps, that is, a tire material mixing step, a tire material processing step, a green tire molding step, a vulcanization step, an inspection step after vulcanization, and the like. When manufacturing the pneumatic tire according to the present embodiment, for example, recess portions and protrusion portions corresponding to the tread pattern illustrated in FIG. 2 are formed in the inner wall of a vulcanization mold, and vulcanization is performed by using this mold.

ADDITIONAL EMBODIMENTS

Next, Additional Embodiments 1 to 5 that can optionally be implemented on the above-described Basic Embodiment of the pneumatic tire according to an embodiment of the present technology will be described.

Additional Embodiment 1

In Basic Embodiment, it is preferable that at least three (four in FIGS. 1 and 2) circumferential main grooves are formed, and on at least either of the vehicle mounting inner side or outer side, the groove width of the circumferential main groove 22b (22c) located on the inner side in the tire width direction is smaller than that of the circumferential main groove 22a (22d) located on the outer side in the tire width direction (Additional Embodiment 1).

Assuming that the total groove volume and the groove depth of each of the circumferential main grooves formed in the tire tread are identical, tire noise can be further reduced by decreasing the groove width of the circumferential main groove 22b (22c) on the inner side in the tire width direction that is dominant with respect to tire noise in FIG. 2.

Additional Embodiment 2

Figure 3:
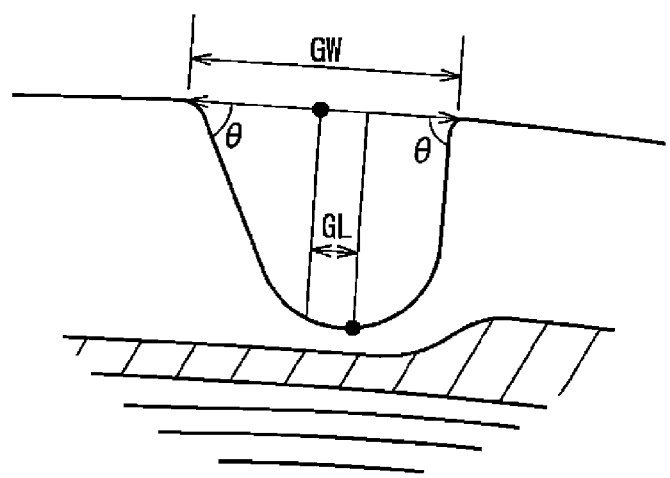
FIG. 3 is an enlarged view of the circled portion X in FIG. 1.

FIG. 3 is an enlarged view of the circled portion X in FIG. 1, and specifically is a tire meridian cross-sectional view illustrating the circumferential main groove 22d located on the outermost side in the tire width direction illustrated in FIG. 2. In FIG. 3, a reference sign GW denotes an actual dimension of a line connecting both end points of the circumferential main groove 22d on the groove surface (both-end-point connecting line), and a reference sign GL denotes an actual dimension between a center position in the tire width direction on the groove surface and a groove bottom position along the both-end-point connecting line. Note that FIG. 3 illustrates an example in which the groove bottom is determined to be one point. When the groove bottom is not one point, the center position of the groove bottom in the tire width direction is defined as the groove bottom position.

In Basic Embodiment and an embodiment obtained by combining Basic Embodiment with Additional Embodiment 1, as illustrated in FIG. 3, it is preferable that a groove bottom center position of the circumferential main groove is located closer to the outer side in the tire width direction than a groove surface center position of the circumferential main groove, and a ratio GL/GW of the dimension GL between the groove surface center position and the groove bottom center position of the circumferential main groove to the groove width GW on the groove surface of the circumferential main groove is 0.1 or more and 0.4 or less (Additional Embodiment 2).

It is known that, the more on the inner side in the tire width direction a groove is located, the larger tire noise is. In the present embodiment, when the groove bottom center position is set closer to the outer side in the tire width direction than the groove surface center position, the groove surface center position shifts to the outer side in the tire radial direction as the circumferential main groove wears. Thus, tire noise can be efficiently reduced especially in the late stages of wear. In particular, when the ratio GL/GW is 0.1 or more, the reduction effect described above can be effectively achieved. When the ratio GL/GW is 0.2 or more, the above effect is achieved at a high level.

On the other hand, when the ratio GL/GW is 0.4 or less, the shapes of both land portions located on both sides in the tire width direction of the circumferential main groove in a tire meridian cross-sectional view can be favorably formed, that is, the bending angle θ illustrated in FIG. 3 can be increased. This makes it possible to ensure excellent rigidity especially at or near the edges of both land portions and thus further improve steering stability performance. When the ratio GL/GW is 0.3 or less, the above effect is achieved at a high level.

As described above, when the groove bottom center position of the circumferential main groove is located closer to the outer side in the tire width direction than the groove surface center position of the circumferential main groove and the ratio GL/GW is 0.1 or more and 0.4 or less, the circumferential main groove itself is formed to extend from the inner side to the outer side in the tire width direction toward the inner side (groove bottom side) from the outer side (groove surface side) in the tire radial direction, in a tire meridian cross-sectional view. When focusing on one circumferential main groove, it is preferable that the circumferential main groove is formed in such a manner that, among groove walls of the circumferential main groove, the groove wall on the inner side in the tire width direction is more inclined with respect to the tire radial direction in a tire meridian cross-sectional view. The configuration described above prevents excessive reduction in block rigidity at or near the groove surfaces of the land portions located on both sides in the tire width direction of the circumferential main groove, and thus excellent block rigidity can be ensured.

Additional Embodiment 3

In Basic Embodiment and an embodiment obtained by combining Basic Embodiment with at least either of Additional Embodiments 1 or 2, the ratio UAI/UAO described above is preferably 0.35 or more and 0.7 or less (Additional Embodiment 3).

When the ratio UAI/UAO is 0.35 or more, the change in rigidity at the boundary between the center region Ce and the shoulder region Sh is not excessively large, and thus steering stability performance can be further improved. When the ratio UAI/UAO is 0.40 or more, the above effect is achieved at a high level.

On the other hand, when the ratio UAI/UAO is 0.70 or less, the cross-sectional area of the undertread rubber 16a having a relatively hard nature can be sufficiently reduced in the center region Ce having a high impact on tire noise. In other words, the cap tread rubber 16b having a soft nature can reliably remain in the center region Ce even at the terminal stage of wear so that tire noise can be reduced. When the ratio UAI/UAO is 0.65 or less, the above effect is achieved at a high level.

Additional Embodiment 4

In Basic Embodiment and an embodiment obtained by combining Basic Embodiment with at least one of Additional Embodiments 1 to 3, the difference in hardness between the cap tread rubber 16b and the undertread rubber 16a illustrated in FIG. 1 is preferably 5 or more and 15 or less in JIS (Japanese Industrial Standard) hardness (Additional Embodiment 4).

Here, JIS hardness is a value measured by a method using a durometer as a measuring apparatus, as defined by JIS K 6253.

In view of the fact that, the lower the hardness of a rubber formed on a tire surface is, the lower tire noise is, when the difference in hardness described above is 5 or more in JIS hardness, the tire noise reduction effect by exposing relatively soft rubber on a tire surface can be further enhanced over a period from when a tire is new until the terminal stage of tire wear. When the difference in hardness is 7 or more in JIS hardness, the above effect is achieved at a higher level.

On the other hand, when the difference in hardness described above is 15 or less in JIS hardness, especially in the shoulder region Sh, the undertread rubber 16a can deform sufficiently in accordance with an input from a road surface to the cap tread rubber 16b during travel of a vehicle. This makes it possible to realize more excellent steering stability performance. When the difference in hardness is 13 or less in JIS hardness, the above effect is achieved at a higher level.

Additional Embodiment 5

Figure 4:
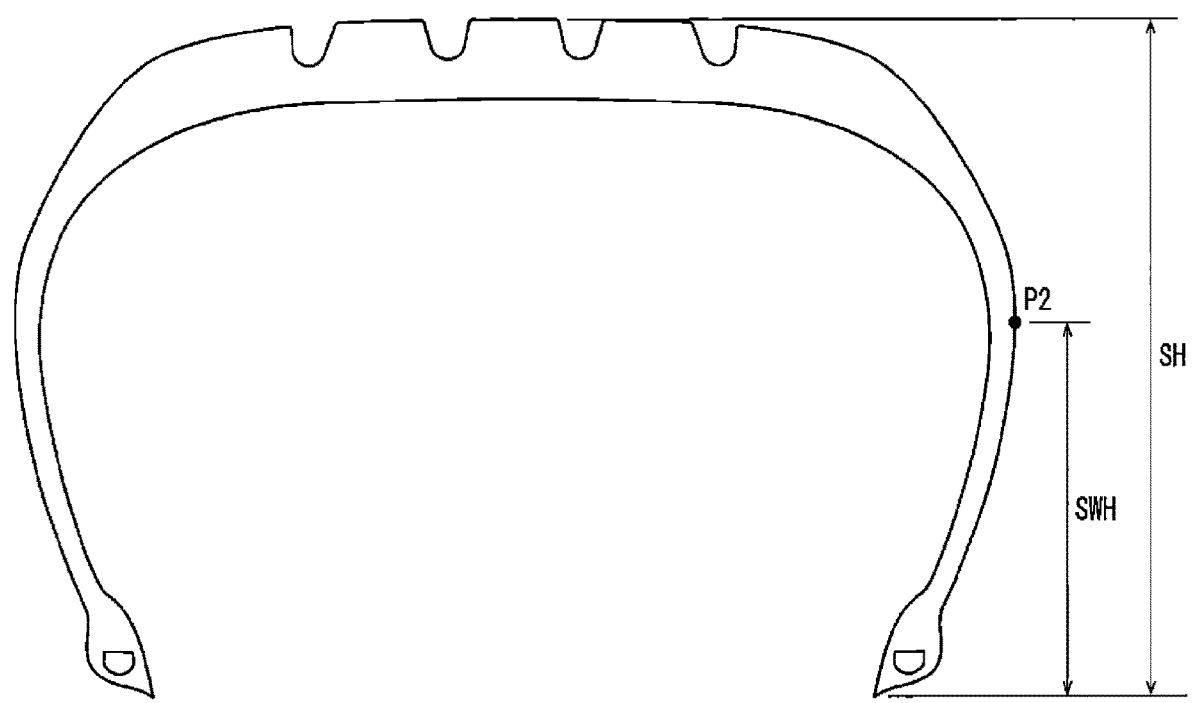
FIG. 4 is a tire meridian cross-sectional view illustrating a modified example of the pneumatic tire according to the present embodiment illustrated in FIG. 1.

FIG. 4 is a tire meridian cross-sectional view illustrating a modified example of the pneumatic tire according to the present embodiment illustrated in FIG. 1. In Basic Embodiment and an embodiment obtained by combining Basic Embodiment with at least one of Additional Embodiments 1 to 4, as illustrated in FIG. 4, it is preferable that a ratio SWH/SH of a shortest distance SWH between a line segment drawn parallel to a rotation axis of a tire at a maximum width position P2 of the tire and a line segment drawn parallel to the rotation axis of the tire at a bead toe to a cross-sectional height SH of the tire is 0.40 or more and 0.55 or less (Additional Embodiment 5).

When the ratio SWH/SH is 0.40 or more, excessive increase in a tire radial direction dimension from the tire maximum width position P2 to a tire radial direction outermost position can be prevented in the tire meridian cross-sectional view illustrated in FIG. 4. This makes it possible to prevent excessive deformation mainly in a sidewall portion to a shoulder portion due to an input during travel and propagation of such deformation to a bead portion which leads to fitting misalignment between a tire bead portion and a rim, and consequently realize excellent tire durability. When the ratio SWH/SH is 0.43 or more, the above effect is achieved at a higher level.

On the other hand, when the ratio SWH/SH is 0.55 or less, the tire radial direction dimension from the tire maximum width position P2 to the tire radial direction outermost position can be sufficiently ensured in the tire meridian cross-sectional view illustrated in FIG. 4. This makes it possible to smooth the changes in thickness (that is, the changes in rigidity) from a tread portion through a shoulder portion to a sidewall portion in a tire meridian cross-sectional view. With the smooth changes in rigidity described above, regions locally loaded during travel can be reduced, and consequently steering stability performance can be further improved. When the ratio SWH/SH is 0.52 or less, the above effect is achieved at a higher level.

Examples

Pneumatic tires according to Examples 1 to 6 and Conventional Example having a tire size of 195/65R15 91H, the tire meridian cross-sectional shape illustrated in FIG. 1 and the tread pattern illustrated in FIG. 2 were manufactured. Note that the detailed conditions of these pneumatic tires are as shown in Table 1 below.

The pneumatic tires according to Examples 1 to 6 and the pneumatic tire according to Conventional Example manufactured in this manner are evaluated for tire noise (when new and when totally worn) and steering stability performance in accordance with the following procedures.

Tire Noise (when New and when Totally Worn)

The magnitude of the pass-by noise outside a vehicle when traveling on a road surface satisfying the ISO (The International Organization for Standardization) 10844:1994 specification was evaluated. Specifically, a test vehicle mounted with each of the test tires was driven at a speed of 50 km/h on a test course, and the tire noise was measured 8 times from both sides in the width direction of the vehicle, and the average value thereof was calculated. The measurement results are expressed as index values with the result of the Conventional Example being regarded as the reference (100). The smaller the index value is, the better the tire noise is. Note that the measurement was performed on the tires when new and when totally worn. Here, "when totally worn" means a state where a wear indicator displayed at a position of 1.6 mm from a groove bottom of the tire in a tire radial direction is just exposed. The results are shown in Table 1.

Steering Stability Performance (when New)

The test tires were mounted on wheels having a rim size of 15×6J, mounted on a passenger vehicle, and driven on a test course on a dry road surface, and sensory evaluation was performed by a test driver. The results are expressed as index values, with the result of Conventional Example being regarded as 100. The larger the index value, the superior the steering stability performance. The results are shown in Table 1. Note that the steering stability performance was measured on the tires when new. When the tires are totally worn, the thickness of a tread is decreased, and thus the rigidity of the tread in a shearing direction and cornering power are increased. Therefore, it is clear that all Examples 1 to 6 produce better results than Conventional Example.

In Table 1, the ratio CAO/UAO refers to a ratio of the cross-sectional area CAO of a cap tread rubber to the cross-sectional area UAO of an undertread rubber in a region of the shoulder region, located closer to the inner side in the tire radial direction than an imaginary line that extends in parallel to a tire profile line at a position located 1.6 mm on the outer side in the tire radial direction from the groove bottom of a circumferential main groove. The ratio UAI/UAO refers to a ratio of the cross-sectional area UAI of the undertread rubber in the center region to the cross-sectional area UAO of the undertread rubber in the shoulder region. The ratio L/W refers to a ratio of a dimension L from an intersection point P1 between the imaginary line and a tread profile line to a ground contact edge to a tire width direction dimension W in each of the shoulder regions. The ratio GL/GW refers to a ratio of a dimension GL between a groove surface center position and a groove bottom center position of a circumferential main groove to a groove width GW on the groove surface of the circumferential main groove when the groove bottom center position of the circumferential main groove is located closer to the outer side in a tire width direction than the groove surface center position. The ratio SWH/SH refers to a ratio of a shortest distance SWH between a line segment drawn parallel to a rotation axis of the tire at a maximum width position P2 of the tire and a line segment drawn parallel to the rotation axis of the tire at a bead toe to a tire cross-sectional height SH. These reference signs and the like are in accordance with the descriptions described above in the present specification.

TABLE 1-1

|  | Conventional Example | Example 1 | Example 2 |
|---|---|---|---|
| Configurations of carcass, belt and tread rubber | FIG. 1 and FIG. 2 | FIG. 1 and FIG. 2 | FIG. 1 and FIG. 2 |
| JIS hardness of undertread rubber | 60 | 65 | 65 |
| JIS hardness of cap tread rubber | 65 | 62 | 62 |
| Average thickness of undertread rubber: Smaller/Larger in center region than in shoulder region | Larger | Smaller | Smaller |
| Ratio CAO/UAO | 2.32 | 0.71 | 0.71 |
| Ratio UAI/UAO | 1.00 | 0.19 | 0.19 |
| Ratio L/W | 0.52 | 0.42 | 0.42 |
| Groove width of circumferential main groove: Smaller on inner side in tire width direction than on outer side in tire width direction, or identical | Identical | Identical | Smaller |
| Ratio GL/GW | 0.00 | 0.09 | 0.09 |
| Difference in hardness between cap tread rubber and undertread rubber | 4 | 4 | 4 |
| Ratio SWH/SH | 0.56 | 0.56 | 0.56 |
| Tire noise when new (dB) | 100 | 98 | 93 |
| Tire noise when totally worn (dB) | 100 | 93 | 91 |
| Steering stability performance | 100 | 102 | 102 |

TABLE 1-2

|  | Example 3 | Example 4 | Example 5 | Example 6 |
|---|---|---|---|---|
| Configurations of carcass, belt and tread rubber | FIG. 1 and FIG. 2 | FIG. 1 and FIG. 2 | FIG. 1 and FIG. 2 | FIG. 1 and FIG. 2 |
| JIS hardness of undertread rubber | 65 | 65 | 65 | 65 |
| JIS hardness of cap tread rubber | 62 | 62 | 62 | 62 |
| Average thickness of undertread rubber: Smaller/Larger in center region than in shoulder region | Smaller | Smaller | Smaller | Smaller |
| Ratio CAO/UAO | 0.71 | 0.71 | 0.71 | 0.71 |
| Ratio UAI/UAO | 0.19 | 0.30 | 0.30 | 0.30 |
| Ratio L/W | 0.42 | 0.42 | 0.42 | 0.42 |
| Groove width of circumferential main groove: Smaller on inner side in tire width direction than on outer side in tire width direction, or identical | Smaller | Smaller | Smaller | Smaller |
| Ratio GL/GW | 0.21 | 0.21 | 0.21 | 0.21 |
| Difference in hardness between cap tread rubber and undertread rubber | 4 | 4 | 6 | 6 |
| Ratio SWH/SH | 0.56 | 0.56 | 0.56 | 0.50 |
| Tire noise when new (dB) | 93 | 93 | 91 | 91 |
| Tire noise when totally worn (dB) | 87 | 87 | 85 | 85 |
| Steering stability performance | 102 | 104 | 105 | 106 |

Table 1 shows that each of the pneumatic tires according to Examples 1 to 6, which belong to the technical scope of the present technology (that is, improvements are made particularly to the relationship between the average thicknesses of the undertread rubber in the center region and the shoulder region, the relationship between the cross-sectional area CAO of the cap tread rubber and the cross-sectional area UAO of the undertread rubber in the shoulder region, the relationship between the cross-sectional area UAI of the undertread rubber in the center region and the cross-sectional area UAO of the undertread rubber in the shoulder region, and the relationship between a dimension from a predetermined position on a tire surface to a ground contact edge and the tire width direction dimension in each shoulder region as well as the relationship between the hardnesses of the undertread rubber and the cap tread rubber), is improved in tire noise (when new and when totally worn) and steering stability performance in a well-balanced manner when compared with the pneumatic tire according to Conventional Example which does not belong to the technical scope of the present technology.

The invention claimed is:

1. A pneumatic tire, comprising:
a carcass comprising at least one carcass ply;
a belt comprising a belt layer comprising cords, the belt being disposed on an outer side in a tire radial direction of the carcass; and
a tread rubber disposed on the outer side in the tire radial direction of the belt, the tread rubber constituting a portion of a tread portion;
at least one circumferential main groove having a total width of 15% or greater of a ground contact width being formed in the tread portion,
the tread rubber comprising an undertread rubber and a cap tread rubber formed on the outer side in the tire radial direction of the undertread rubber, the cap tread rubber being formed of rubber having a hardness lower than a hardness of the undertread rubber,
in a state in which the pneumatic tire is mounted on a specified rim, inflated to 92% of a specified internal pressure, and loaded with a load of 75% of a maximum load capacity,
when a tire ground contact width is divided into four regions in a tire width direction in a tire meridian cross-sectional view and two out of the four regions located in a center in the tire width direction are regarded as a center region and remaining two regions are regarded as shoulder regions, an average thickness of the undertread rubber being smaller in the center region than in the shoulder regions,
in the tire meridian cross-sectional view, in a region of the shoulder regions, located closer to an inner side in the tire radial direction than an imaginary line that extends in parallel to a tire profile line in the center region at a position located 1.6 mm on the outer side in the tire radial direction from a groove bottom of the at least one circumferential main groove, a ratio CAO/UAO of a cross-sectional area CAO of the cap tread rubber to a cross-sectional area UAO of the undertread rubber being 0.15 or more and 0.95 or less,
in an entire area of the center region and the shoulder regions in the tire meridian cross-sectional view, a ratio UAI/UAO of a cross-sectional area UAI of the undertread rubber in the center region to a cross-sectional area UAO of the undertread rubber in the shoulder regions being less than 1, and
in a tire plan view, a ratio L/W of a tire width direction dimension L from an intersection point P1 between an extension line of the imaginary line and a tread profile line to a ground contact edge to a tire width direction dimension W of each of the shoulder regions being 0.29 or more and 0.51 or less; wherein
a groove bottom center position of the at least one circumferential main groove is located closer to the outer side in the tire width direction than a groove surface center position of the at least one circumferential main groove,
a ratio GL/GW of a dimension GL between the groove surface center position and the groove bottom center position of the at least one circumferential main groove to a groove width GW on a groove surface of the at least one circumferential main groove is 0.1 or more and 0.21 or less, and a difference in hardness between the cap tread rubber and the undertread rubber is 5 or more and 15 or less in JIS hardness.

2. The pneumatic tire according to claim 1, wherein at least three circumferential main grooves are formed, the at least three circumferential main grooves including the at least one circumferential main groove, and on at least either of a vehicle mounting inner side or outer side, a groove width of one of the at least three circumferential main grooves located on an inner side in the tire width direction is smaller than a groove width of an other one of the at least three circumferential main grooves located on an outer side in the tire width direction.

3. The pneumatic tire according to claim 2, wherein the ratio UAI/UAO is 0.35 or more and 0.7 or less.

4. The pneumatic tire according to claim 3, wherein a ratio SWH/SH of a shortest distance SWH between a line segment drawn parallel to a rotation axis of the tire at a maximum width position P2 of the tire and a line segment drawn parallel to the rotation axis of the tire at a bead toe to a cross-sectional height SH of the tire is 0.40 or more and 0.55 or less.

5. The pneumatic tire according to claim 1, wherein the ratio UAI/UAO is 0.35 or more and 0.7 or less.

6. The pneumatic tire according to claim 1, wherein a ratio SWH/SH of a shortest distance SWH between a line segment drawn parallel to a rotation axis of the tire at a maximum width position P2 of the tire and a line segment drawn parallel to the rotation axis of the tire at a bead toe to a cross-sectional height SH of the tire is 0.40 or more and 0.55 or less.

* * * * *